United States Patent [19]
Melo

[11] Patent Number: 5,802,307
[45] Date of Patent: Sep. 1, 1998

[54] NETWORK COMMUNICATIONS SUBSYSTEM AND METHOD FOR DIGITAL COMPUTER SYSTEM EMPLOYING PROTOCOL STACK HAVING DIVERSE LOWER-LEVEL NETWORK DRIVER COMPONENTS OPTIMIZED FOR EACH OF BASE AND ENHANCE OPERATING SYSTEMS

[75] Inventor: Michael D. Melo, Billerica, Mass.

[73] Assignee: Sun Microsystems, Inc., Mountain View, Calif.

[21] Appl. No.: 564,381

[22] Filed: Nov. 24, 1995

[51] Int. Cl.[6] .................................................... G06F 13/00
[52] U.S. Cl. ............... 395/200.62; 395/872; 395/200.3; 395/200.31; 395/200.6; 395/868
[58] Field of Search ........................... 395/800, 250, 395/500, 670, 412, 800.3, 800.31, 824, 310, 200.3, 200.31, 200.55, 200.57, 200.58, 200.59, 200.6, 200.62, 681, 309, 835, 839, 840, 868, 872

[56] References Cited

U.S. PATENT DOCUMENTS

| | | | |
|---|---|---|---|
| 5,029,077 | 7/1991 | Fatahalian et al. | 345/112 |
| 5,133,078 | 7/1992 | Minassian et al. | 395/872 |
| 5,274,819 | 12/1993 | Blomfield - Brown | 395/670 |
| 5,592,624 | 1/1997 | Takahashi et al. | 395/200.42 |
| 5,604,885 | 2/1997 | Denio | 395/500 |
| 5,696,970 | 12/1997 | Sandage et al. | 395/681 |

FOREIGN PATENT DOCUMENTS 572865  5/1992  European Pat. Off. .

OTHER PUBLICATIONS

Toshiaki Sasamori et al, "Sysmac Link Windows Driver"; pp. 143–148 1995, Omron Technics vol. 35, No. 2.
Kenneth Koontz, "Port Buffers: A Mach IPC Optimization for handling Large Volumes of Small Messages"; Mach, III symposium, pp. 89–102.
Ballou, Melinda –Carol; "Windows–to–DOS tools get boots"; Computer World V27 n38, p. 108. Sep. 20, 1993.

*Primary Examiner*—Meng-Ai T. An
*Attorney, Agent, or Firm*—Richard A. Jordan

[57] ABSTRACT

A communication subsystem for a digital computer system, which processes application programs under a base operating system (such as the MS-DOS operating system) in a first processor operational mode (such as the V86 mode), and also under an enhanced operating system (such as Microsoft Windows) during a session under a second processor operational mode (such as a privileged or user mode). During an enhanced operating system session, the enhanced operating system makes use of at least some selected elements of the base operating system, in particular relation to the current invention some of the communications drivers. The communication subsystem enables the digital computer system to transfer messages, each comprising a series of characters, over a communications network. The communication subsystem comprises an upper level communication driver and a base lower level communications driver both forming part of the base operating system and a enhanced lower level communications driver forming part of the enhanced operating system. The upper level communications driver and the base lower level communications driver form part of a protocol stack by which the digital computer system, while under control of the base operating system, transmits and receives messages over the communications network. During a message transmission, the upper level communications driver iteratively provides characters of the message being transmitted to the base lower level communications driver for transmission, and while receiving a message the base lower level communications driver iteratively providing characters of the message being received to the upper level communications driver. During an enhanced operating system session, the upper level communications driver and the enhanced lower level communications driver form at least part of similar protocol stack, but characters are transferred between them using multiple-character buffers.

39 Claims, 8 Drawing Sheets

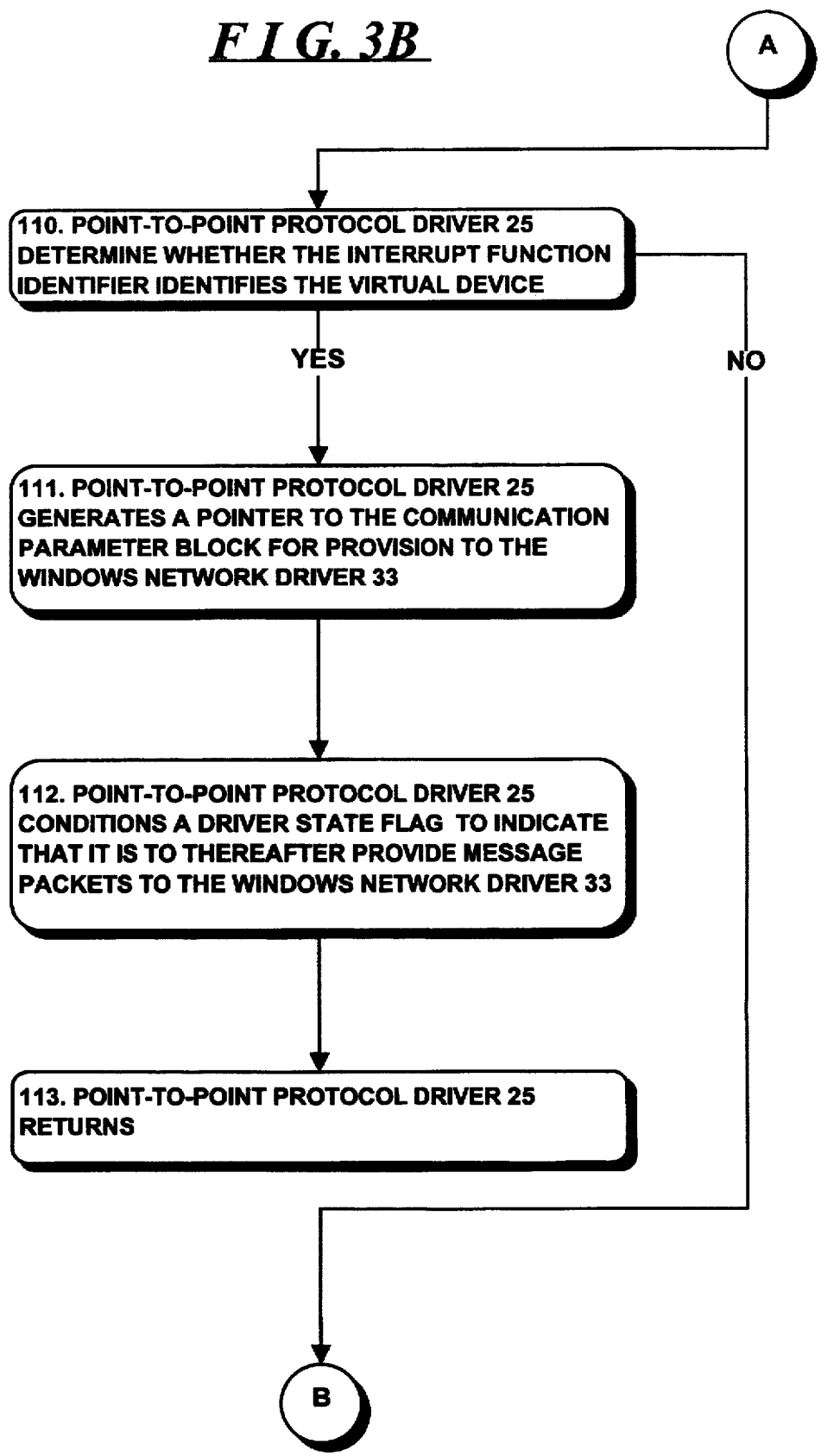

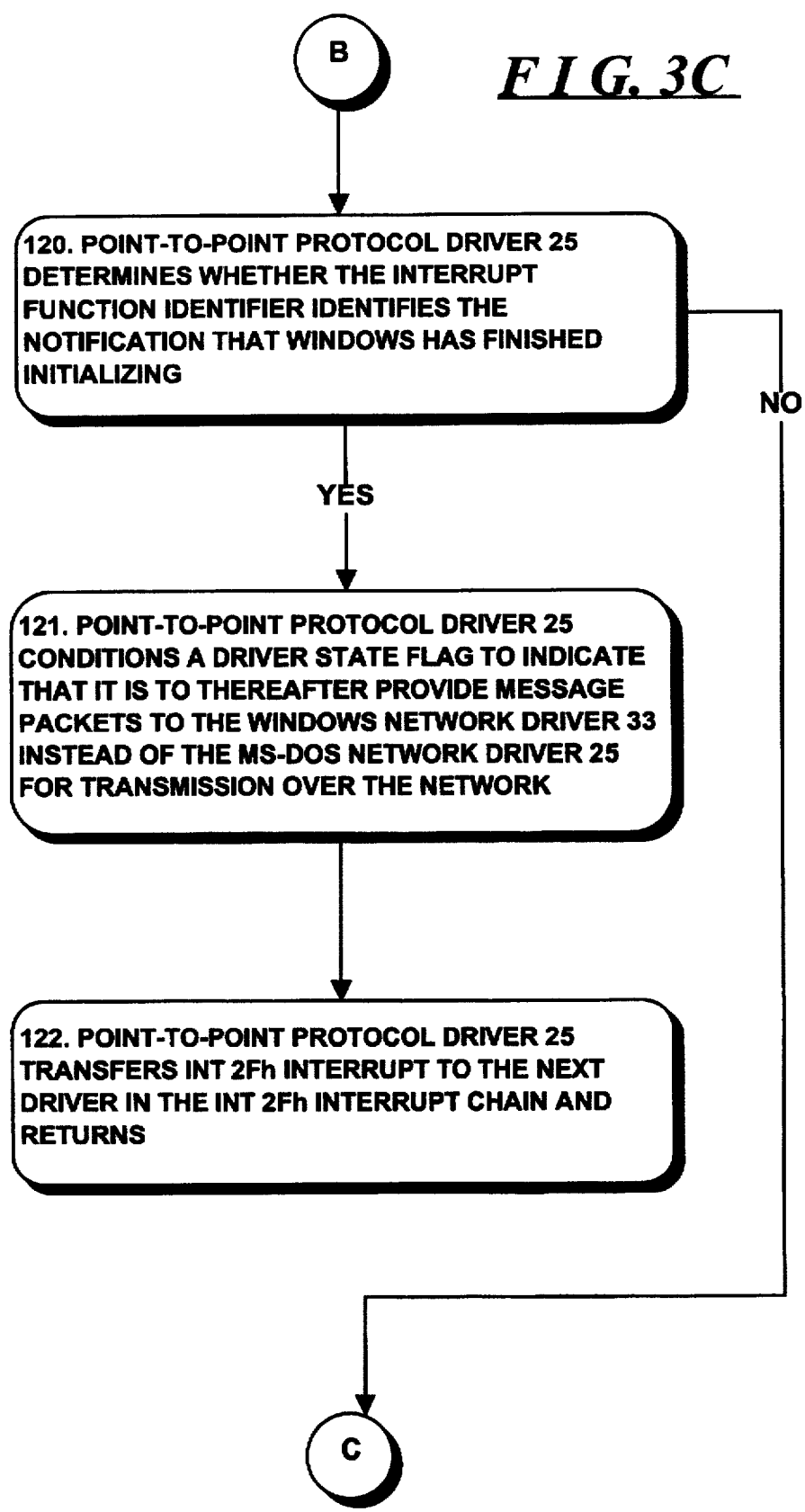

NETWORK COMMUNICATIONS SUBSYSTEM AND METHOD FOR DIGITAL COMPUTER SYSTEM EMPLOYING PROTOCOL STACK HAVING DIVERSE LOWER-LEVEL NETWORK DRIVER COMPONENTS OPTIMIZED FOR EACH OF BASE AND ENHANCE OPERATING SYSTEMS

FIELD OF THE INVENTION

The invention relates generally to the field of digital computer systems and more specifically to a network communications subsystem for use in connection with a digital computer system connected in a network.

BACKGROUND OF THE INVENTION

In modern "enterprise" digital data processing systems, that is, computer systems for use in an office environment in a company, a number of personal computers, workstations, and other devices such as mass storage subsystems, network printers and interfaces to the public telephony system, are typically interconnected in a computer network. The personal computers and workstations are used by individual users to perform processing in connection with data and programs that may be stored in the network mass storage subsystems. In such an arrangement, the personal computers/workstations, operating as clients, download the data and programs from the network mass storage subsystems for process. In addition, the personal computers or workstations will enable processed data to be uploaded to the network mass storage subsystems for storage, to a network printer for printing, to the telephony interface for transmission over the public telephony system, or the like. In such an arrangement, the network mass storage subsystems, network printers and telephony interface operate as servers, since they are available to service requests from all of the clients in the network. By organizing the network in such a manner, the servers are readily available for use by all of the personal computers/workstations in the network. Such a network may be spread over a fairly wide area, with the personal computers/workstations being interconnected by communication links such as electrical wires or optic fibers.

In performing data processing operations, computer systems make use of applications programs to perform such operations as database management, word processing, accounting, process control and numerous other functions in an office or industrial environment. The applications programs generally make use of operating systems both to provide an environment in which they can be conveniently executed and to provide system services such as low-level control of various hardware elements. One popular operating system, namely, Microsoft Windows™ ("Windows") operates in conjunction with Microsoft's MS-DOS operating system to provide an environment in which a number of applications programs can be executed. The Windows operating system provides, among other things, a graphical user interface ("GUI") as well as a multi-tasking operating environment in which a plurality of application programs can be executed contemporaneously. To initiate a Windows session, the operator will first energize the computer system and enable it to load and run the MS-DOS operating system, and from MS-DOS the operator will enable the computer system to load and run Windows.

Typically network communications make use of complex multi-layered protocols, with various layers in the protocols being handled by various driver programs which are organized in a protocol "stack." Data is typically transmitted over a network in the form of messages, each of which includes the data that is to be transmitted as well as protocol information which is used to identify, among other things, the destination computer system and an application or other program to receive and process the data. Depending on the amount of data to be transmitted, the data may be divided into a number of blocks which are to be transmitted in a series of message packets, and the drivers in one or more of the protocol layers will also be responsible for generating the respective blocks and messages, and for ensuring that the receiving computer system receives all of the packets and assembles the data in the various packets into an appropriate sequence for use by the application program at the destination which is to process the data. To accomplish that, drivers in certain of the protocol layers may need to ensure that the destination computer system receives the complete series of the message packets transmitted by the source computer system, and in the process the source computer system may need to retransmit certain of the message packets if they are not properly received at the destination. In addition, drivers at certain of the protocol layers may need to perform "flow control" to ensure that the source computer system does not transmit message packets faster than the destination computer system can receive and process them. Furthermore, a driver at the lowest protocol level generally provides message packets as generated by higher-level drivers to the network hardware, which, in turn, generates signals for transmission over the network's communication links. In addition, the low-level driver will also be responsible for receiving the characters received by the network hardware and providing them to the higher-level drivers.

Typically, Windows will make use of MS-DOS drivers in connection with network communications. However, the MS-DOS low-level drivers typically transfer message packet data therebetween in a manner which, if they were to be used in Windows, would be inefficient. In particular, typical MS-DOS low-level drivers transfer packet data therebetween on a character-by-character basis, whereas in Windows, it would be considerably more efficient to have low-level drivers transfer message packet data therebetween on a buffer-by-buffer basis, with each buffer comprising some number of characters. However, a problem arises if a Windows low-level driver is merely substituted for an MS-DOS driver at the beginning of a Windows session, and the MS-DOS low-level driver returned at the end of the Windows session, since such substitution may result in an undesirable interruption in connection with control of the network hardware which can adversely affect communications over the network.

Another problem arises from the fact that typically the processor of a computer system operates under a number of operational modes. In processors having the architecture of the 8086 processor family from Intel Corporation [including, for example, microprocessors designated 8086, 8088, 80286, 80386, 80486 and 80586 (sold under the trademark "Pentium")], which are generally used in computer systems such as personal computers, the processor's operational modes include, for example, a privileged mode, a user mode and a "V86" operational mode. While processing MS-DOS application programs under the MS-DOS operating system, the processor is normally operating in the V86 operational mode, while during a Windows session the Windows operating system and its drivers are processed in the privileged operational mode and Windows application programs are processed in the user operational mode. During a Windows session, Windows uses a number of services provided by MS-DOS, which may include certain network communication services which are provided by the MS-DOS drivers. When Windows uses an MS-DOS driver, Windows switches the processor's operational mode from its current operational mode, which may be either the privileged operational mode or the user operational mode, to the V86 operational mode, and after the MS-DOS driver has finished the processor's operational mode is returned from the V86 mode to the prior mode. Typically, such operational mode switches can necessitate lengthy processing.

SUMMARY OF THE INVENTION

The invention provides a new and improved network communications subsystem for a digital computer system connected in a network. The invention specifically provides a new network communications subsystem for use in connection with Microsoft's MS-DOS and Windows operating systems that, when Windows is initialized at the beginning of a Windows session, provides for the loading of a Windows low-level driver, which is used instead of the MS-DOS low-level driver during the Windows session, so as to avoid undesirable interruption of control of the network hardware, thereby avoiding adversely affecting communications over the network.

In brief summary, the invention provides a new communication subsystem for a digital computer system, which processes application programs under a base operating system (such as the MS-DOS operating system) in a first processor operational mode (such as the V86 mode), and also under an enhanced operating system (such as Microsoft Windows) during a session under a second processor operational mode (such as a privileged or user mode). During an enhanced operating system session, the enhanced operating system makes use of at least some selected elements of the base operating system, in particular relation to the current invention some of the communications drivers. The communication subsystem enables the digital computer system to transfer messages, each comprising a series of characters, over a communications network. The communication subsystem comprises an upper level communication driver and a base lower level communications driver both forming part of the base operating system and a enhanced lower level communications driver forming part of the enhanced operating system. The upper level communications driver and the base lower level communications driver form part of a protocol stack by which the digital computer system, while under control of the base operating system, transmits and receives messages over the communications network. During a message transmission, the upper level communications driver iteratively provides characters of the message being transmitted to the base lower level communications driver for transmission, and while receiving a message the base lower level communications driver iteratively providing characters of the message being received to the upper level communications driver. During an enhanced operating system session, the upper level communications driver and the enhanced lower level communications driver form at least part of similar protocol stack but characters are transferred between them using multiple-character buffers. Since the upper level communications driver and enhanced lower level communications driver transfer characters for a message in multiple-character buffers, rather than character by character, the number of mode switches is reduced, which enhances processing efficiency.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
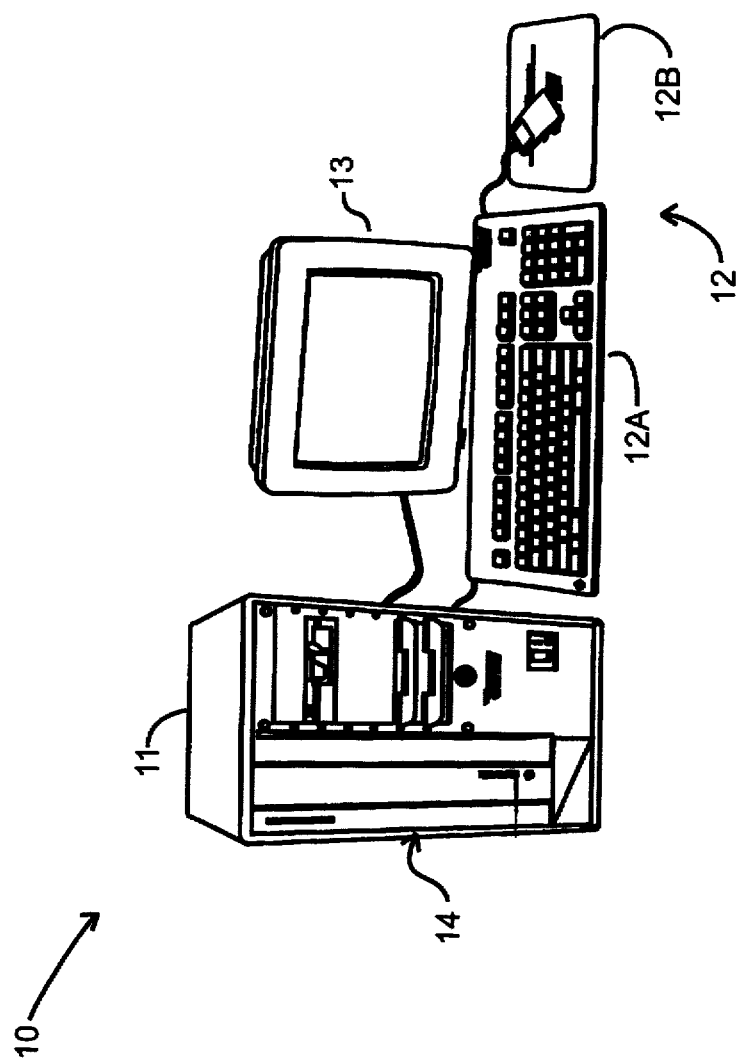
FIG. 1 depicts an illustrative computer system incorporating a network communications subsystem in accordance with the invention.

FIG. 1 depicts an illustrative computer system 10 constructed in accordance with the invention. With reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, processor, memory and mass storage devices such as disk and/or tape storage elements (not separately shown) which perform processing and storage operations in connection with digital data provided thereto. The operator input element(s) 12 are provided to permit an operator to input information for processing. The video display device 13 is provided to display output information generated by the processor module 11 on a screen to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 includes one or more network interfaces, generally identified by reference numeral 14, which are connected to communication links which connect the computer system 10 in a computer network. The network interface 14 enables the computer system 10 to transmit information to, and receive information from, other computer systems in the network, allowing them to share information. In addition, if devices such as printers and facsimile transmission and receiving devices, digital audio or video storage and distribution devices, and the like, are connected in the network, they may be shared by the various computer systems which are connected in the network; for such devices, the computer systems will transmit information to the various devices enabling them to, for example, print documents in hard-copy form or transmit facsimiles of the documents over the public telephony system, receive document facsimiles, transmit and receive digital audio and video information and the like.

As is conventional, information is transmitted over the network in the form of messages, with each message having a particular structure which depends on the particular protocol used in the message transfer. Each message is typically in the form of a series of characters which are transmitted serially over a communication link. The communication links interconnecting the computer systems in the network may, as is conventional, comprise any convenient information-carrying medium, including wires, optical fibers or other media for carrying signals among the computer systems.

Typically, communications are facilitated over a network by a combination of special purpose network hardware elements (including the network interface 14) and the computer system's processor element under control of one or more computer programs termed "drivers." To transmit message packets over the network, the computer programs enable the processor element to generate message packet data according to the structure(s) required by the protocols which have been selected for the network. The message packet typically comprises a series of characters, with each character comprising a selected number of digital data bits. The message packet includes the particular information to be transferred (generally, "message data"), as well as addressing, protocol and other information (generally "protocol information") which is used to control the transfer of the message data from the source computer system to the destination computer system and the particular program at the destination computer system which is to use the information to be transferred. The driver programs also enable the processor elements to transfer the characters comprising the message packet to the network hardware elements, which, in turn, will use the characters that they receive from the processor element to control the generation and transmission of the particular signals representing the successive bits comprising the characters over the network communication links. In receiving messages over the network, the computer system's network hardware elements will receive signals representing the successive message data bits from the communication links, assemble them into characters and will supply the characters to the computer system's processing elements. Also under driver program control, the processing elements will assemble the received message characters into a message packet and use the message packet's protocol information to identify the particular program(s) at the destination which is (are) to receive and process the message data and enable the processing elements to use the message information for use in connection with processing of those program(s).

Typically, communication links used in networks will comprise single wire or optical fiber links which transfers the data in a message packet bit-serially. During transmission of a message packet, the computer system's processing elements will, under drive control, supply successive characters of the packet to the network hardware elements, which transmits the characters bit-serially as signals over the network's communication link. During reception of a message packet, the network hardware elements will receive the signals defining the message packet, interpret them as serial bits and accumulate successively-received bits into characters. When the network hardware elements have received all of the bits of a character, they can supply the character to the processing elements for further processing.

The driver programs which control network communications enable the computer system's processing elements to receive the message data to be transferred and add protocol information to generate one or more message packets to be transmitted and supply the successive characters of the message packet to the network hardware elements for transmission over the network's communication links. In addition, in connection with packets received over the network, the driver programs control the processing elements to receive the successive characters from the network hardware elements and buffer them to form a complete message packet. The buffered message is, in turn, processed under control of the driver programs to determine the application or other program to receive the information contained in the message. The driver programs, in conjunction with memory management programs which control allocation of the computer system's memory resources, control allocation of memory buffers which are used to buffer message packets during transmission and reception.

The network hardware elements as described above will typically include a serializer/deserializer element and a signal generator/receiver element. The serializer/deserializer element will receive the character data from the processing elements in parallel form and covert it to serial form, which it provides to the signal generator/receiver element. The signal generator/receiver element will, in response to the serial data bits it receives from the serializer/deserializer element, actually generate the signals for transmission over the network. In addition, the signal generator/receiver element will receive signals from the network and convert them to digital data bits, which it supplies to the serializer/ deserializer element. The serializer/deserializer element, in turn, accumulates successive data bits in parallel form for provision to the processing elements. The serializer/ deserializer may comprise a conventional "UART" ("Universal Asynchronous Receive and Transmit") device 40 (not shown in FIG. 1, see FIG. 2). The signal generator/ receiver element (represented by network interface 14) which is used with computer system 10 will depend on the particular type of communication link which is used to carry signals over the network, as well as a particular coding scheme which is selected to represent each data bit.

The invention provides an arrangement for use in connection with Microsoft Corporation's MS-DOS and Windows operating system programs for facilitating communications by computer system 10 over a network. By way of background, a computer system 10 will run Microsoft Windows in conjunction with Microsoft's MS-DOS operating system program (hereinafter "MS-DOS") during a Windows session. The MS-DOS operating system provides an operating environment in which application programs written for it (hereinafter "MS-DOS application programs) can be executed, and provides a number of operating system services, including drivers for transmitting and receiving messages over a network in accordance with particular networking protocols. In addition, Windows provides an environment in which applications programs written for it (hereinafter "Windows application programs") can be executed and provides, among other things, a graphical user interface ("GUI") as well as a multi-tasking operating environment in which a plurality of Windows programs can be executing contemporaneously. Windows further provides an environment in which applications programs written for MS-DOS (hereinafter "MS-DOS applications programs") can be executed during a Windows session.

In its processing operations, the computer system's processor operates under a number of operational modes. In one embodiment, in which the processor has the architecture of the 8086 processor family from Intel Corporation [including, for example, microprocessors designated 8086, 8088, 80286, 80386, 80486 and 80586 (sold under the trademark "Pentium")], the processor's operational modes include, for example, a privileged mode, a user mode and a "V86" operational mode. In that embodiment, the processor processes the MS-DOS operating system and MS-DOS application programs in the V86 operational mode, the Windows operating system and its drivers in the privileged operational mode and Windows application programs in the user operational mode. During a Windows session, Windows uses a number of services provided by MS-DOS, which may include certain network communication services which are provided by the MS-DOS drivers. When Windows uses an MS-DOS driver, Windows switches the processor's operational mode from its current operational mode, which may be either the privileged operational mode or the user operational mode, to the V86 operational mode, and after the MS-DOS driver has finished the processor's operational mode is returned from the V86 mode to the prior mode. Typically, such operational mode switches can necessitate lengthy processing.

Windows requires that the computer system 10 be under control of the MS-DOS operating system prior to Windows being started. In initializing MS-DOS, the computer system will initialize an MS-DOS network communication subsystem which controls network communications in connection with MS-DOS application programs as described above. In addition, when Windows is later initialized, it will also establish its own Windows network communication system, which will include at least part of the MS-DOS network communication subsystem and an additional driver, which will control network communications during the Windows session. The invention provides that, during the transition from the MS-DOS network communications subsystem to the Windows network communication subsystem, there will be no undesirable interruption in connection with control of the network hardware which can adversely affect communications over the network.

In particular, the MS-DOS and Windows network communication subsystems include a number of drivers in common. The MS-DOS network communication subsystem also includes a driver which directly controls the network hardware elements, which is used only under MS-DOS, and the Windows network communication subsystem includes a corresponding driver which is loaded during Windows initialization to directly control the network hardware elements during the Windows session. The Windows driver provides services similar to those provided by the MS-DOS driver, but it operates in a manner more efficiently under Windows that would the MS-DOS driver. To ensure that is no undesirable interruption in connection with control of the network hardware which can adversely affect communications over the network, the Windows driver communicates with the previously-loaded network drivers (that is, the drivers which operate both under MS-DOS and during the Windows session) during initialization to obtain communication parameter information which it will use in connection with communications during the Windows session.

Figure 2:
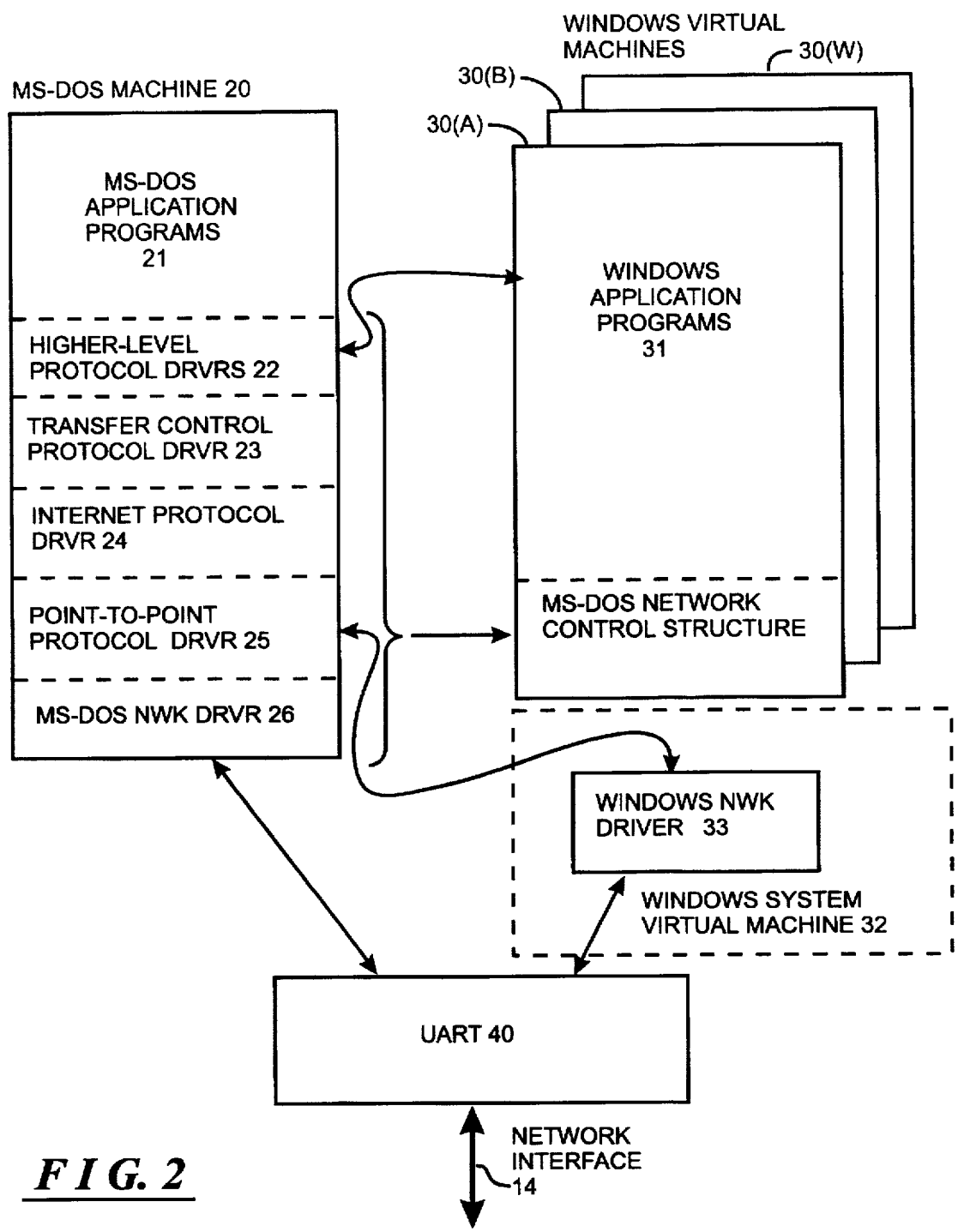
FIG. 2 depicts data structures useful in understanding the network communications subsystem depicted in FIG. 1.
Figure 3A:
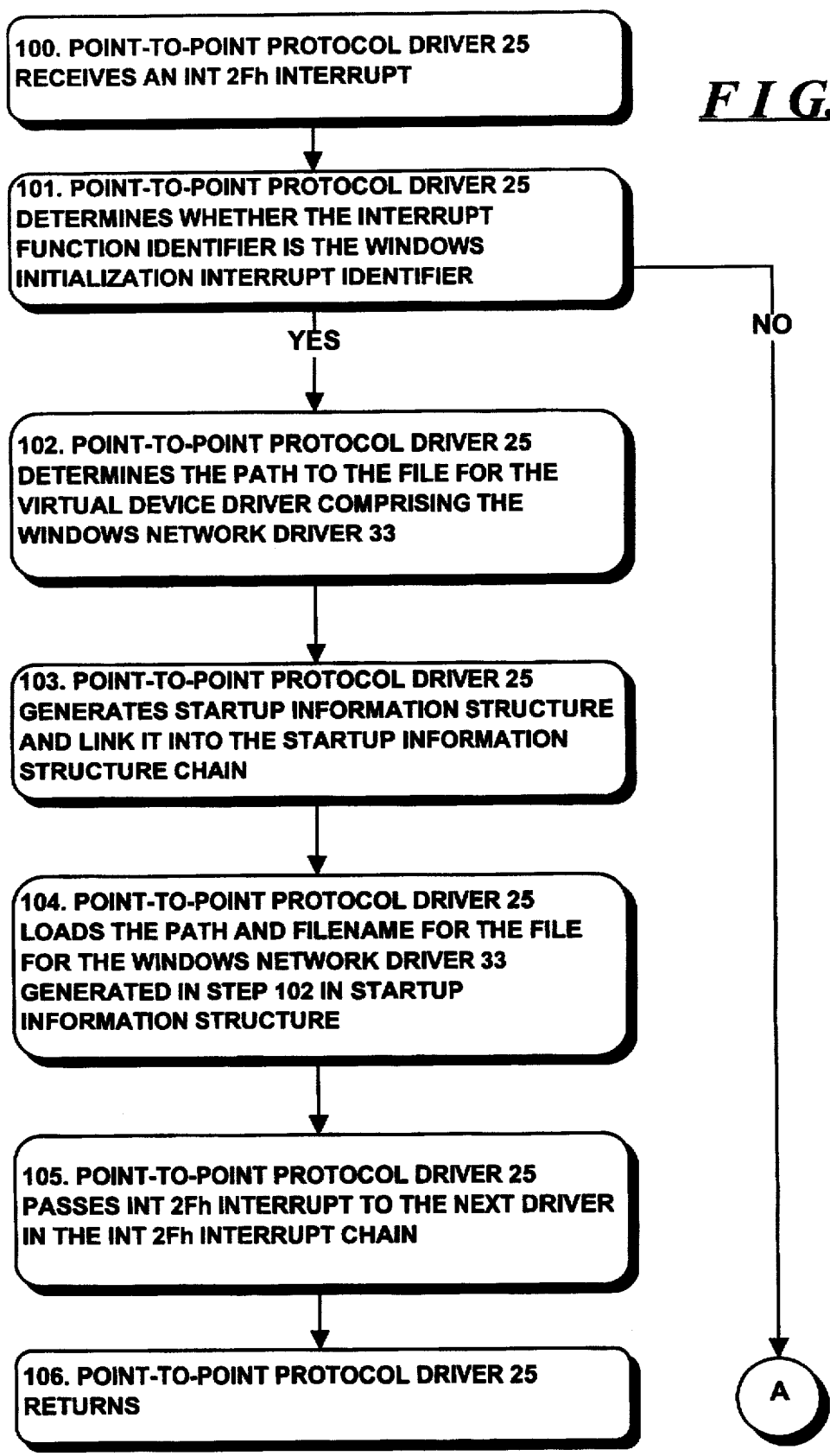
FIGS. 3 and 4 depict flow diagrams useful in understanding the operations of the network communications subsystem depicted in FIG. 2.
Figure 3D:
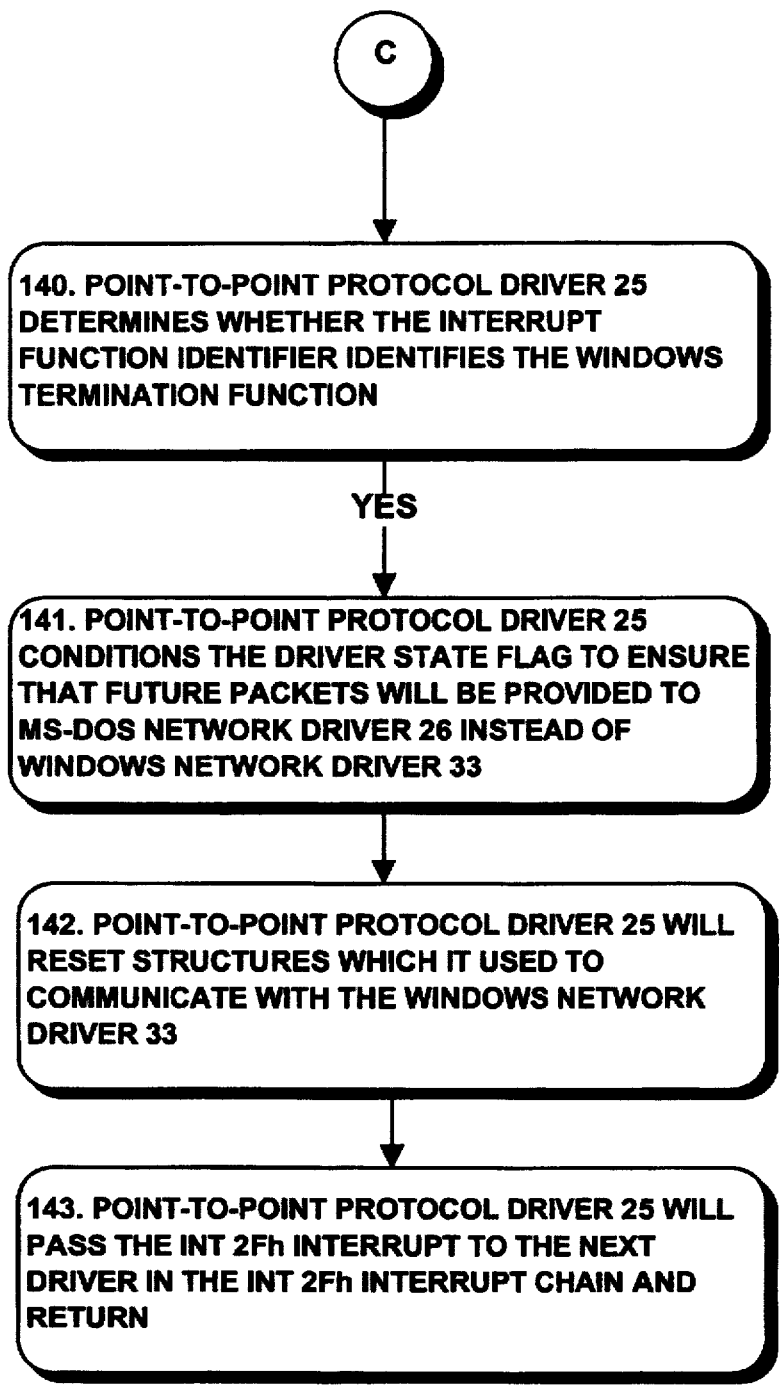
Figure 4A:
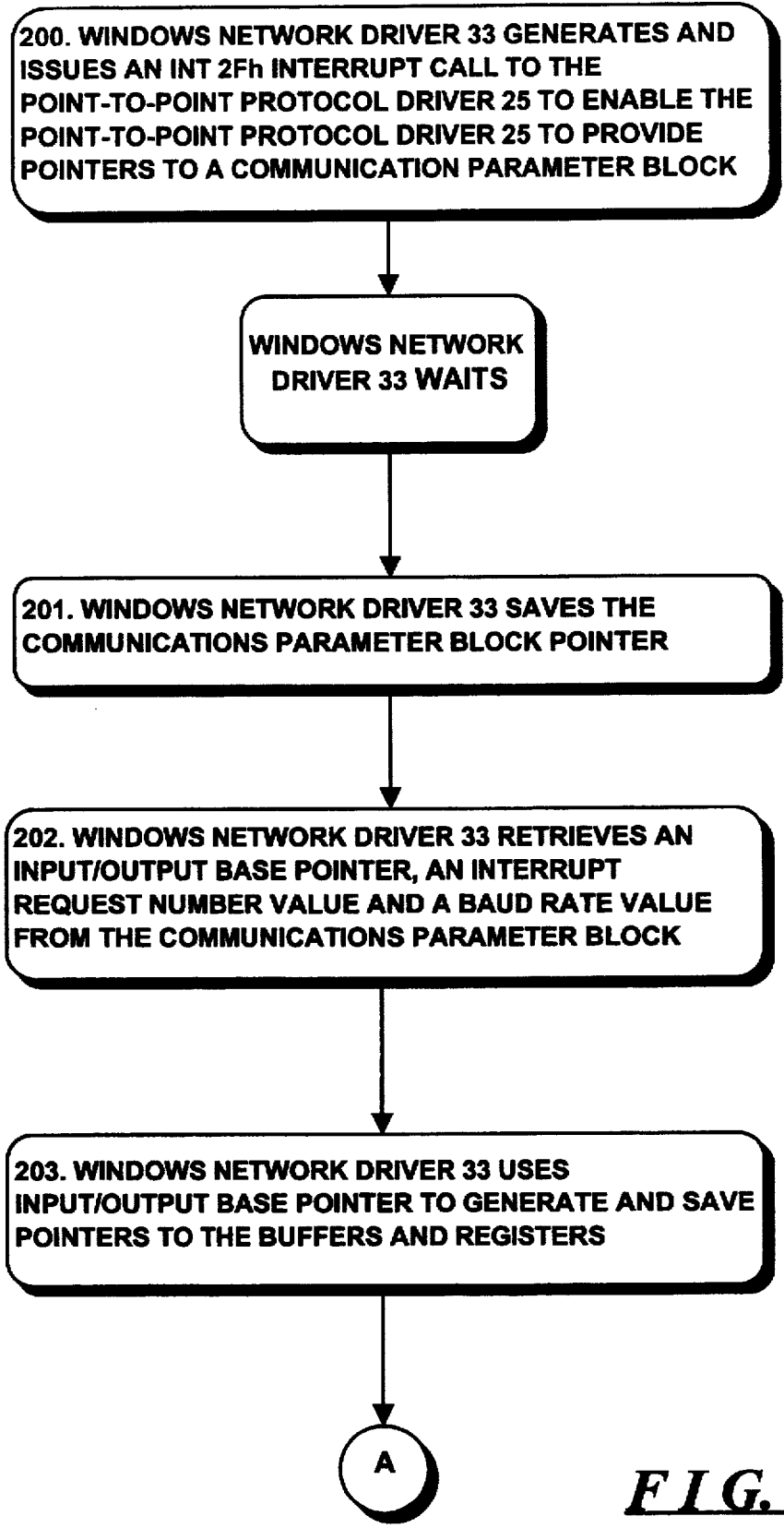
Figure 4B:
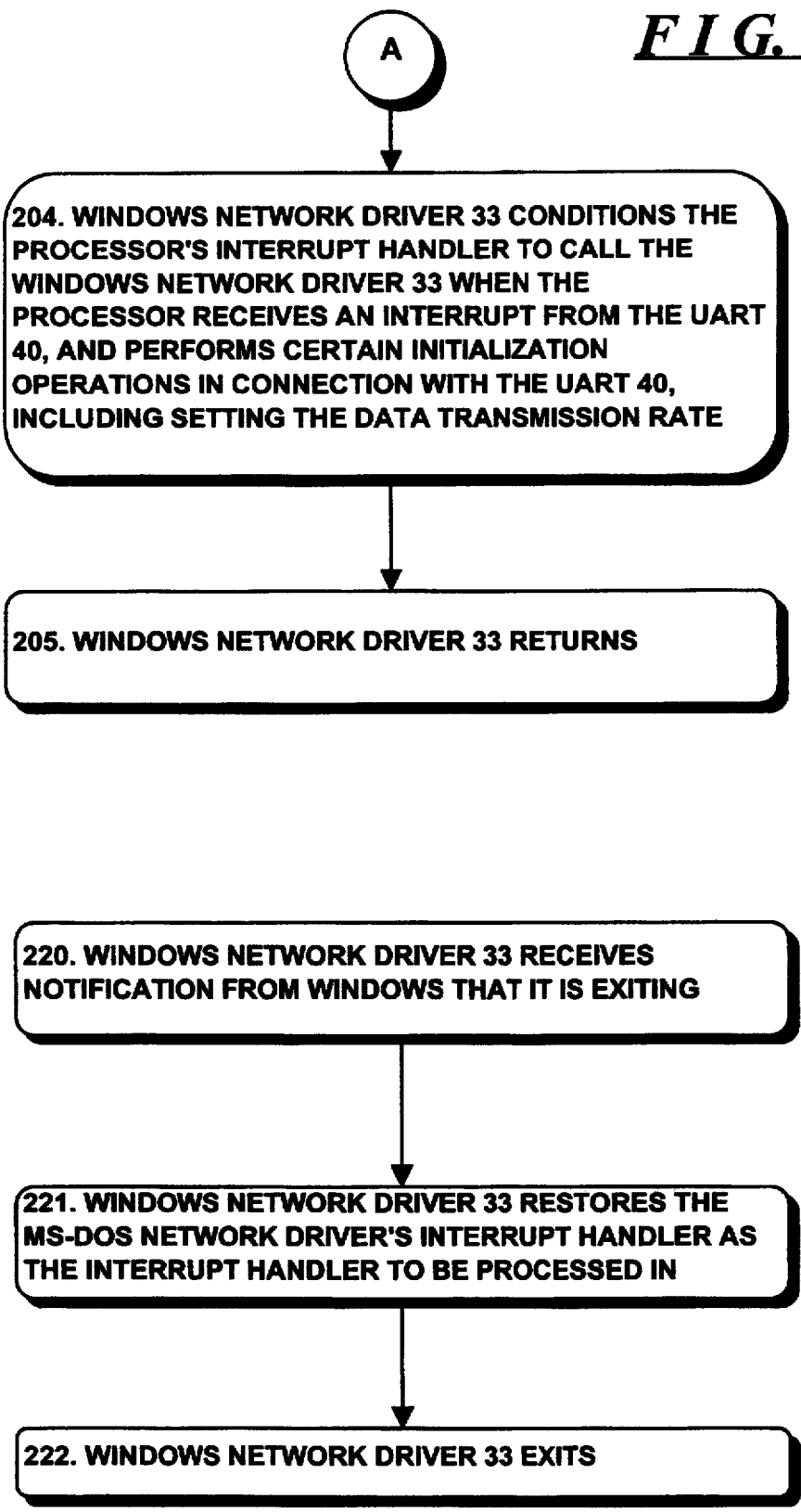

The invention will be described in connection with the functional block diagram depicted in FIG. 2 and the flow diagrams depicted in FIGS. 3 and 4. FIG. 3 depicts operations of the MS-DOS network driver program in connection with the invention and FIG. 4 depicts operations of the Windows network driver program in connection with the invention. With reference initially to FIG. 2, that FIG. schematically depicts an MS-DOS "machine" 20 which is established when the computer system 10 initializes the MS-DOS operating system. The MS-DOS machine 20 respectively represents the processing "environment" in which the computer system 10 processes MS-DOS application programs prior to the Windows session. In addition, FIG. 2 schematically depicts a plurality of Windows "virtual machines" 30(A) through 30(W) (generally identified by reference numeral 30(w)) which represents the processing "environment(s)" in which the computer system 10 processes Windows application programs 31. Windows also provides a system virtual machine 32 which manages the Windows virtual machines 30(w) and provides operating system program services thereto.

The MS-DOS machine 20 includes a number of elements which receive calls for operating system services from one or more MS-DOS application programs 21. Of particular interest in connection with the instant invention, the operating system programs include a stack of driver programs which facilitate the transfer of information over the network. In one particular embodiment, these network control programs include a transfer control protocol ("TCP") driver 23, an Internet protocol ("IP") driver 24, a point-to-point protocol ("PPP") driver 25 and an MS-DOS network serial driver 26. The transfer control protocol driver 23, the Internet protocol driver 24 and the point-to-point protocol driver 25 implement a well-known network protocol, namely, the TCP/IP protocol, to provide for a reliable transfer of information over the network. It will be appreciated that the MS-DOS machine 20 may also provide other drivers 22 which provide higher-level protocol services in connection with information transfer over the network.

To facilitate transfer of information with another computer system 10 over the network, the drivers 22–26 will, inter alia, open a logical connection with the other computer system at the beginning of a communication session, provide for message flow control, and provide that transmitted messages are received. In addition, the drivers 22–26 may divide the message data received from an application program for transmission over the network into a series of blocks which will be transmitted in separate message packets, and that data in the message packets when they are received are assembled in a selected order for use by the application program at the receiving computer system. The drivers 22–26 may also close the logical connection when, for example, an application program 21 transferring information during a communication session indicates that the communication session is over,. The computer system 10 may have a plurality of communication sessions open with other computer systems at any particular time.

For message transmission over the network, each driver 22–26 in the stack may, in connection with message data received from a higher-level driver or from the application program 21 which provided the data for transmission, add protocol information for its particular portion of the protocol and pass the information to the lower-level driver in the stack for further processing. The point-to-point protocol driver 25 will provide the message information serially byte-by-byte to the MS-DOS network driver 26, which in turn, provides each byte to the UART 40. The UART 40, in turn, provides each byte bit-serially to the network interface 14, which generates a signal for transmission over the network communication link. On the other hand, in connection with reception of messages over the network, the network interface 14 will receive bits over the network and provide them to the UART 40, which will assemble sequences of bits into byte form for provision to the MS-DOS network driver 26. The MS-DOS network driver 26 will receive the successive bytes from the UART 40 and provide them to the point-to-point protocol driver 25. The point-to-point protocol driver 25, in turn, assembles bytes into message packets, and processes each message packet to strip any point-to-point protocol information that was added by the point-to-point protocol driver at the transmitting computer system and provide the processed message packet to the higher-level drivers 24–22. Each driver 24–22 in the series which receives the message packet may also process the packet in a similar manner, to eventually provide the data in the packet to an application program 21 to receive the data.

As described above, Windows provides one or more virtual machines 30(w) which provide environments for processing application programs 31. At least the operating system and drivers of the MS-DOS machine 20, including the network protocol drivers 22–26, are mapped into each Windows virtual machine 30(w) to provide MS-DOS and other services to application programs 31 being processed therein. In addition, Windows provides a system virtual machine 32 which controls the virtual machines 30(w) and provides operating system services thereto. Of particular interest to this invention, the Windows system virtual machine 32 includes a Windows network driver 33 which performs services similar to those performed by the MS-DOS network driver 26, in particular controlling transmission and reception through the network interface 14, during a Windows session, in an efficient manner. In particular, instead of transferring message data with the point-to-point protocol driver 25 byte-by-byte, which would require operational mode switches from the current Windows operational mode to the V86 mode, and back, for each byte that would be received by the MS-DOS network driver 26, the Windows network driver 33 transfers data with the point-to-point protocol driver 25 in multiple-byte buffers, which requires operational mode switches only when the Windows network driver 33 and point-to-point protocol driver 25 are to transfer the buffer. Accordingly, use of the Windows network driver 33 allows for significantly enhanced processing efficiency by reducing the number of operational mode switches performed by the processor during communications.

During initialization of Windows, particularly during initialization of the Windows network driver 33, the Windows network driver 33 and point-to-point protocol driver 25 communicate with each other so that the Windows network driver 33 can obtain current operating information. The communications between the point-to-point protocol driver 25 and the Windows network driver 33 ensure that there will be no interruption in control of the UART 40 which can negatively affect transfer of information over the network. In addition, the Windows network driver 33 will assume control of the UART 40 so that data received thereby from the network interface 14 will be passed to the Windows network driver 33 instead of the MS-DOS network driver 26 during the Windows session. After the Windows network driver 33 has been initialized, it will control information transfer of information between the point-to-point protocol driver 25 to the UART 40 during the Windows session. At the end of a Windows session, the point-to-point protocol driver 25 and Windows network driver 33 will also communicate with each other, and the Windows network driver 33 will return control of the UART 40 to the MS-DOS network driver 26 so that data received by the UART 40 will be passed to the MS-DOS network driver 26. After the Windows session has ended, the MS-DOS network driver 25 will be responsible for controlling transfer of information between the point-to-point protocol driver 25 and UART 40.

The operations performed by the point-to-point protocol driver 25 and Windows network driver 33 will be described in connection with FIGS. 3 and 4, with FIG. 3 depicting operations performed by the point-to-point protocol driver 25 and FIG. 4 depicting operations performed by the Windows network driver 33. The point-to-point protocol driver 25 is responsible for enabling Windows to load Windows network driver 33 during Windows initialization. During Windows initialization at the beginning of a Windows session, Windows notifies drivers and other programs (generally "drivers") currently running in the computer system 10 that it is initializing by issuing a predetermined software interrupt, which is sequentially received and processed by all of the drivers in a software interrupt chain. The drivers which receive the notification may, for example, notify Windows of other drivers, termed "Windows virtual device drivers" ("VxD's") that they may need to run in the Windows environment, which Windows may load and run in the system virtual machine 32. With particular reference to the computer system 10, the point-to-point protocol driver 25 may use the Windows initialization notification to, in turn, notify Windows that it (Windows) is to load the Windows network driver 33.

A number of the operations performed by the point-to-point protocol driver 25 and the Windows network driver 33 make use of a software interrupt structure provided by the MS-DOS operating system. Before proceeding further, it would be helpful to describe this software interrupt structure. The software interrupt structure provides an interrupt chain (termed an "INT 2Fh" interrupt chain) that is provided by the MS-DOS operating system, which contains entries for drivers and other programs which may provide services to other programs or which may need to receive notifications of certain events in the computer system so that they can perform certain operations in response.

An INT 2Fh interrupt may be issued by any program to obtain the services of a driver which may be linked in the INT 2Fh interrupt chain, or to provide the event notifications as described above. When a program issues an INT 2Fh software interrupt, it accompanies the INT 2Fh interrupt with an interrupt identifier code that may identify a particular event which may need to be serviced by all of the drivers linked in the INT 2Fh interrupt chain, or which may identify a certain operation to be performed by a single driver linked in the INT 2Fh interrupt chain. Certain INT 2Fh software interrupts, such as those used by Windows for notifications as described above, are to be received and processed by all of the drivers linked in the INT 2Fh interrupt chain, whereas other INT 2Fh software interrupts, such as those requesting service by a particular driver, are to be received and processed by only the one driver. In connection with an INT 2Fh interrupt to be received and processed by all of the drivers in the INT 2Fh interrupt chain, when the operating system receives an INT 2Fh interrupt, it refers the interrupt to the first driver in the INT 2Fh interrupt chain, which performs operations required in connection with the interrupt and then passes the interrupt to the next driver or other program linked in the INT 2Fh interrupt chain. When the last driver in the INT 2Fh interrupt chain has finished its operations, the operating system returns control to the program which issued the INT 2Fh interrupt (such as Windows, in the case of Windows notifications).

On the other hand, in connection with an INT 2Fh interrupt to request service by a particular driver, the operating system also refers the interrupt to the first driver in the INT 2Fh interrupt chain, which determines from the interrupt identifier whether it is to perform an operation in response, and, if so, performs the operation and returns control to the operating system program. However, if the first driver in the INT 2Fh interrupt chain determines from the interrupt identifier that it is not to perform an operation in response to the INT 2Fh interrupt, it will pass the interrupt to the next driver in the INT 2Fh chain. Successive drivers in the INT 2Fh interrupt chain will repeat these operations until the interrupt reaches the driver which is to process the interrupt. When it receives the interrupt, the driver will process the interrupt, and return control to the operating system, which, in turn, will return control to the program which issued the interrupt.

As noted above, the point-to-point protocol driver 25 is responsible for enabling Windows to load Windows network driver 33 during Windows initialization. The point-to-point protocol driver 25 will be linked in the INT 2Fh interrupt chain at MS-DOS initialization, and, upon receipt of the INT 2Fh interrupt generated by Windows to notify the drivers of Windows initialization, it (the point-to-point protocol driver 25) will perform a number of operations to facilitate loading by Windows of the Windows network driver 33, including searching through the computer system's mass storage subsystem to determine the location of computer files which contain the virtual device driver comprising the Windows network driver 33 and generating a Windows startup information structure including the path and filename of the located computer files. Windows, in turn, will use the startup information structure to load and begin initialization of the virtual device driver.

More specifically, and with reference to FIG. 3, when the point-to-point protocol driver 25 receives an INT 2Fh interrupt (step 100) it will initially use the interrupt function identifier to determine the operations it is to perform. With specific reference to the Windows initialization, if it (the point-to-point protocol driver 25) determines that the interrupt function identifier is the Windows initialization interrupt identifier (step 101), it will sequence to a series of steps to generate a startup information structure and link it in a series of startup information structures generated by the drivers in the INT 2Fh interrupt chain. Initially, the point-to-point protocol driver 25 will determine the path to the file for the virtual device driver comprising the Windows network driver 33 (step 102). The file for the Windows network driver 33 will have a predetermined file name, and in determining the path to the file the point-to-point protocol driver 25 will search one or more paths through the directories of the computer system's mass storage subsystem to determine whether there is a file with the predetermined filename along one of the paths. In one embodiment, in performing step 102 the point-to-point protocol driver 25 will use path information contained in a master environment block maintained by the MS-DOS operating system, as well as selected default paths (such as the directory containing Windows programs or selected subdirectories thereof) to identify a path which may point to the file for the Windows network driver 33.

After locating a path containing the Windows network driver 33, the point-to-point protocol driver 25 will generate the startup information structure and link it into the startup information structure chain. In that operation, the point-to-point protocol driver 25 will generate a next startup information structure pointer which corresponds to the pointer for the previous startup information structure generated by a driver during the Windows startup notification interrupt processing (step 103) and the path and filename for the file for the Windows network driver 33 virtual device driver which was generated in step 102 (step 104). Thereafter, the point-to-point protocol driver 25 will enable the INT 2Fh interrupt to be passed to the next driver in the INT 2Fh interrupt chain (step 105), and return (step 106).

At some point after the INT 2Fh interrupt has been processed by all of the drivers, including the point-to-point protocol driver 25, in the INT 2Fh interrupt chain, Windows will begin processing the startup information structures in the startup information structure chain generated during Windows startup. In that operation, Windows will load and initialize all of the virtual device drivers, including the Windows network driver 33, identified in the startup information structures in the chain. During initialization of the Windows network driver 33, the driver 33 will communicate with the point-to-point protocol driver 25 to determine the location of a network communications parameter block, which it (the Windows network driver 33) will use to control communications through the UART 40. In addition, during initialization, the Windows network driver 33 will perform conventional operations such as initializing addresses for callbacks which Windows application programs use to obtain information as to the operational status of the Windows network driver 33, determine the addresses of the various registers of UART 40, take control of interrupts generates by the UART 40, and so forth.

More specifically and with reference to FIG. 4, during initialization the Windows network driver 33 will first generate and issue an INT 2Fh interrupt call to the point-to-point protocol driver 25 (step 200). The INT 2Fh interrupt call will include a driver identifier that identifies the point-to-point protocol driver 25 and a virtual device driver initialization interrupt function identifier to enable the point-to-point protocol driver 25 to provide pointers to a communication parameter block. Windows will pass the INT 2Fh interrupt call to the first driver in the INT 2Fh interrupt chain, and each driver in the INT 2Fh interrupt chain will pass the interrupt to the next driver until the interrupt reaches the point-to-point protocol driver 25.

When the point-to-point protocol driver 25 receives the INT 2Fh interrupt (step 100, FIG. 3), it will initially use the interrupt function identifier to determine the operations it is to perform. If the point-to-point protocol driver 25 determines that the interrupt function identifier identifies the virtual device driver initialization function (step 110), it (the point-to-point protocol driver 25) sequences to step 111 to generate a pointer to the communication parameter block for provision to the Windows network driver 33. In addition, the point-to-point protocol driver 25 will condition a driver state flag to indicate that it (the point-to-point protocol driver 25) is to thereafter provide message packets to the Windows network driver 33 instead of the MS-DOS network driver 25 for transmission over the network (step 112). Thereafter, the point-to-point protocol driver 25 will return (step 113).

After the point-to-point protocol driver 25 returns from the INT 2Fh interrupt, the Windows network driver 33 will save the communications parameter block pointer (step 201, FIG. 4) and will retrieve from the communications parameter block several parameter values, including an input/output base pointer, an interrupt request number value and a baud rate value (step 202). The input/output base pointer represents a value which points to the base, in the address space for the computer system's processor, of a block which used for the input/output operations, including network communications. The input/output block includes a number of elements, including, for example, pointers to input/output buffers which will be used by point-to-point protocol driver 25 and Windows network driver 33 to transfer data therebetween. In addition, the input/output block includes registers for the UART 40. All of these elements will be associated with addresses at predetermined offsets from the base of the input/output block base, and the Windows network driver 33 will use the input/output base pointer to generate and save pointers to the buffers and registers using the input/output base pointer (step 203).

The interrupt request number corresponds to a particular electrical connection between the UART 40 and the computer system's processor to, by means of a hardware interrupt, notify the processor of certain conditions, including the successful transmission of a character through the network interface 14 or the receipt of a character from the network interface 14. In response to the receipt of a hardware interrupt, the processor will call an interrupt handler program, which will process the interrupt to perform selected operations as called for by the particular interrupt. In the case of a hardware interrupt generated by the UART 40, the interrupt handler program comprises the Windows network driver 33, which when called reads the UART's registers to determine the cause of the particular interrupt and perform selected operations which depend on the interrupt's cause. For example, if the Windows network driver 33 determines that the UART's registers indicate receipt of a character from the network, it (the Windows network driver 33) may retrieve the character from a register and transfer the retrieved character to an input/output buffer. On the other hand, if the Windows network driver 33 determines that the UART's registers indicate that it has successfully transmitted a character and is in condition to receive another character for transmission, it (the Windows network driver 33) may, if an input/output buffer contains a character to transmit, retrieve a character from the input/output buffer and provide it to UART 40 for transmission over the network. If the input/output buffer does not contain another character to transmit, the Windows network driver 33 may so notify the UART 40.

In any case, the Windows network driver 33 will, following step 203, condition the processors interrupt handler to call the Windows network driver 33 when the processor receives an interrupt from the UART 40 (step 204). In addition, the Windows network driver 33 will perform certain initialization operations in connection with the UART 40, including setting the data transmission rate, and returns (step 205). At that point, the Windows network driver 33 is in condition to receive data from the point-to-point protocol driver 25 for transmission through the UART 40 and to receive data from the UART 40 to be provided to the point-to-point protocol driver 25.

At some point after Windows initializes the Windows network driver 33, as described above, Windows will issue an INT 2Fh interrupt to notify the drivers linked in the INT 2Fh interrupt chain that it has finished initializing. This INT 2Fh interrupt will include an interrupt function identifier which, in turn, identifies it as notification that Windows has finished initializing itself and all of the virtual device drivers that were identified in the startup information structures. As with the original INT 2Fh described above (that is, the call to indicate that Windows is starting initialization, steps 100–106)), the point-to-point protocol driver 25 will receive the INT 2Fh interrupt (step 100) and initially use the interrupt function identifier to determine the operations it is to perform. If the point-to-point protocol driver 25 determines that the interrupt function identifier identifies the notification that Windows has finished initializing (step 120), it (the point-to-point protocol driver 25) sequences to step 121 to condition a driver state flag to indicate that it (the point-to-point protocol driver 25) is to thereafter provide message packets to the Windows network driver 33 instead of the MS-DOS network driver 25 for transmission over the network. Thereafter, the point-to-point protocol driver 25 will transfer the INT 2Fh interrupt to the next driver in the INT 2Fh interrupt chain and return (step 122).

Following the operations performed by the point-to-point protocol driver 25 in connection with the INT 2Fh interrupt "Windows finished initializing" interrupt function (steps 120 through 122), the point-to-point protocol driver 25 will be in condition to transfer data to the Windows network driver 33 for transmission over the network. In addition the Windows network driver 33 will be in condition to receive data from the network for transfer to the point-to-point protocol driver 25. In connection with data to be transmitted over the network, the point-to-point protocol driver 25 loads data into a buffer and issues a call directly to the Windows network driver 33 to transmit the contents of the buffer, character by character, to the UART 40 for transmission through the network interface 14.

On the other hand, in connection with receipt of data from the network, the Windows network driver 33 receives data, character by character, from the UART 40 and loads them into buffer. When the Windows network driver 33 has accumulated data in the buffer, it (the Windows network driver 33) issues an INT 2Fh interrupt, which identifies the point-to-point protocol driver 25 as the driver to process the interrupt, and an interrupt function identifier indicating that the point-to-point protocol driver 25 is to receive and process the data in the buffer. The INT 2Fh interrupt will be processed as described above, and, when the point-to-point protocol driver 25 receives the INT 2Fh interrupt, it will process the interrupt. In one particular embodiment, the Windows network driver 33 will also provide a buffer descriptor (including a pointer to the base of the buffer and a length value identifying the length of the buffer) along with the INT 2Fh interrupt, and point-to-point protocol driver 25 will effectively process the interrupt by passing the descriptor to the interrupt protocol driver 24 for processing.

The point-to-point protocol driver 25 and Windows network driver 33 will repeat these operations to effect transmission through, and reception of data from, the UART 40. At some point, when the operator desires to end the Windows session both the Windows network driver 33 and point-to-point protocol driver 25 will perform a series of operations to restore the operating conditions which existed prior to the Windows session. At the end of the session, Windows will notify the virtual device drivers that it is exiting, and, when the Windows network driver 33 receives the notification (step 220, FIG. 4), it will restore the MS-DOS network driver's interrupt handler as the interrupt handler to be processed in connection with UART hardware interrupts (step 221) and will exit (step 222). Thereafter, the MS-DOS network driver 26 will receive and process UART hardware interrupts.

In addition, at the end of the Windows session, Windows will issue an INT 2Fh interrupt to the INT 2Fh interrupt chain, identifying a windows termination interrupt function. As described above, each driver in the INT 2Fh interrupt chain will receive INT 2Fh interrupt, perform predetermined operations to prepare for running in an non-Windows environment, and pass the INT 2Fh interrupt to the next driver in the INT 2Fh interrupt chain. When the point-to-point protocol driver 25 receives the INT 2Fh interrupt (step 100, FIG. 3), it will initially use the interrupt function identifier to determine the operations it is to perform. If the point-to-point protocol driver 25 determines that the interrupt function identifier identifies the Windows termination function (step 140), it (the point-to-point protocol driver 25) sequences to step 141 to condition the driver state flag to ensure that future packets will not be provided to the Windows network driver 33, but instead will be provided to the MS-DOS network driver 26 (step 141). In addition, the point-to-point protocol driver 25 will reset structures which it used to communicate with the Windows network driver 33

(step 142). Following step 142, the point-to-point protocol driver 25 will pass the INT 2Fh interrupt to the next driver in the INT 2Fh interrupt chain and return (step 143).

It will be appreciated that, since the MS-DOS network driver 26 will, at this point, be processing hardware interrupts from the UART 40, it will be receiving characters from the UART that the UART, in turn, received from the network interface 14, and passing the characters to the point-to-point protocol driver 25, in a manner similar to that occurring prior to the Windows session. Similarly, the MS-DOS network driver 26 will be receiving characters for transmission over the network from the point-to-point protocol driver 25, which it (the MS-DOS network driver 26) will provide to the UART 40 for transmission over the network, in a manner similar to that occurring prior to the Windows session. Accordingly, the MS-DOS network driver 26 will not need to be reinitialized, but instead need only continue operating as it did prior to the Windows session.

The invention provides a number of advantages. In particular, the invention provides a new network communications subsystem for use in connection with Microsoft's MS-DOS and Windows operating systems that, when Windows is initialized at the beginning of a Windows session, provides for the loading of a Windows network driver 33, which is used instead of the MS-DOS serial network driver 26 during the Windows session to provide efficient communications with the point-to-point protocol driver 25, with the initialization of the Windows network driver 33 occurring so as to avoid undesirable interruption of control of the network hardware, thereby avoiding adversely affecting communications over the network.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A communication subsystem for a digital computer system, the digital computer system processing application programs under a base operating system in a first processor operational mode, the digital computer system further processing application programs under an enhanced operating system during an enhanced operating system session under a second processor operational mode, the enhanced operating system during said enhanced operating system session making use of at least some selected elements of the base operating system, the communication subsystem enabling the digital computer system to transfer messages, each comprising a series of characters, over a communications network, the communication subsystem comprising:

an upper level communication driver and a base lower level communications driver both forming part of the base operating system and an enhanced lower level communications driver forming part of the enhanced operating system, the upper level communications driver and the base lower level communications driver forming part of a protocol stack which transmits and receives respective ones of said messages over the communications network while the digital computer system is operating under control of the base operating system, the upper level communications driver, while the protocol stack is transmitting one of said messages, iteratively providing characters of the message being transmitted to the base lower level communications driver for transmission, and the base lower level communications driver, while the protocol stack is receiving one of said messages, iteratively providing characters of the message being received to the upper level communications driver, the upper level communications driver and the enhanced lower level communications driver forming at least part of another protocol stack which transmits and receives respective ones of said messages over the communications network during a session under which the digital computer system is operating under control of the enhanced operating system, the upper level communications driver, while the other protocol stack is transmitting one of said messages, providing a transmit buffer containing a plurality of characters of the message being transmitted to the enhanced lower level communications driver for transmission, and the enhanced lower level communications driver, while the other protocol stack is receiving a message, providing a receive buffer containing a plurality of characters of the message being received to the upper level communications driver.

2. A communication subsystem as defined in claim 1 in which the base operating system is the MS-DOS operating system.

3. A communication subsystem as defined in claim 1 in which the enhanced operating system is the Windows operating system.

4. A communication subsystem as defined in claim 1 in which the base operating system is operating prior to initiation of said enhanced operating system session, the upper level communications driver assisting the enhanced operating system to load the enhanced lower level communications driver at a beginning of said enhanced operating system session.

5. A communication subsystem as defined in claim 1 in which the enhanced operating system generates an enhanced operating system session start notification at a beginning of an enhanced operating system session, the upper level communications driver responding to receipt of said enhanced operating system start notification by providing a pointer to a file containing a program for the enhanced lower level communications driver, the enhanced operating system using the pointer to load the enhanced lower level communications driver and enable the enhanced lower level communications driver to initialize.

6. A communication subsystem as defined in claim 5 in which the enhanced lower level communications driver, during initialization, obtains selected communications parameter information from the upper level communications driver.

7. A communication subsystem as defined in claim 5 in which the digital computer system includes a message character signal transmitter for transmitting signals representative of the message characters over the communications network, the message character signal transmitter generating an interrupt indication when the message character signal transmitter has finished transmitting signals representative of said message character thereby to enable the message character signal transmitter to be provided with an subsequent character, prior to an enhanced operating system session the base lower level communications driver receiving the interrupt indication, during initialization of the enhanced lower level communications driver the digital computer system being conditioned to provide the interrupt indication to the enhanced lower level communications driver.

8. A communication subsystem as defined in claim 5 in which the digital computer system includes a message character signal receiver for receiving signals representative of the message characters over the communications network, the message character signal receiver generating an interrupt indication when the message character signal receiver has finished receiving signals representative of said message character thereby to enable the enhanced lower level communications driver to receive the character, prior to an enhanced operating system session the base lower level communications driver receiving the interrupt indication, during initialization of the enhanced lower level communications driver the digital computer system being conditioned to provide the interrupt indication to the enhanced lower level communications driver.

9. A communication subsystem as defined in claim 5 in which the enhanced operating system also generates an indication after the enhanced operating system has loaded the enhanced lower level communications driver, the upper level communications driver following receipt thereof transferring the message characters with the enhanced lower level communications driver.

10. A communication subsystem as defined in claim 1 in which the enhanced operating system generates an enhanced operating system session end notification at an end of an enhanced operating system session, the upper level communications driver following receipt thereof transferring the message characters with the base lower level communications driver.

11. A communication subsystem as defined in claim 1 in which the enhanced operating system generates an enhanced operating system session end notification at an end of an enhanced operating system session, the enhanced lower level communications driver following receipt thereof transferring the message characters with the base lower level communications driver.

12. A communication subsystem as defined in claim 11 in which the digital computer system includes a message character signal transmitter for transmitting signals representative of the message characters over the communications network, the message character signal transmitter generating an interrupt indication when the message character signal transmitter has finished transmitting signals representative of said message character thereby to enable the message character signal transmitter to be provided with an subsequent character, prior to receipt of an enhanced operating system session end notification the enhanced lower level communications driver receiving the interrupt indication, and in response to the enhanced operating system session end notification the enhanced lower level communications driver conditioning the digital computer system to provide the interrupt indication to the base lower level communications driver.

13. A communication subsystem as defined in claim 11 in which the digital computer system includes a message character signal receiver for receiving signals representative of the message characters over the communications network, the message character signal receiver generating an interrupt indication when the message character signal receiver has finished receiving signals representative of said message character thereby to enable the enhanced lower level communications driver to receive the character, prior to receipt of an enhanced operating system session end notification the enhanced lower level communications driver receiving the interrupt indication, and in response to the enhanced operating system session end notification the enhanced lower level communications driver conditioning the digital computer system to provide the interrupt indication to the base lower level communications driver.

14. A method of operating a communication subsystem for a digital computer system, the digital computer system processing application programs under a base operating system in a first processor operational mode, the digital computer system further processing application programs under an enhanced operating system during an enhanced operating system session under a second processor operational mode, the enhanced operating system during said enhanced operating system session making use of at least some selected elements of the base operating system, the communication subsystem enabling the digital computer system to transfer the messages, each comprising a series of characters, over a communications network, the communication subsystem comprising an upper level communication driver and a base lower level communications driver both forming part of the base operating system and an enhanced lower level communications driver forming part of the enhanced operating system, the method comprising the steps of while the digital computer system is operating under control of the base operating system, enabling the upper level communications driver and the base lower level communications driver to transmit and receive respective ones of said messages over the communications network the upper level communications driver, while the protocol stack is transmitting one of said messages, iteratively providing characters of the message being transmitted to the base lower level communications driver for transmission, and the base lower level communications driver, while the protocol stack is receiving one of said messages, iteratively providing characters of the message being received to the upper level communications driver, during a session under which the digital computer system is operating under control of the enhanced operating system, enabling the upper level communications driver and the enhanced lower level communications driver to transmit and receive respective ones of said messages over the communications network, the upper level communications driver, while the other protocol stack is transmitting one of said messages, providing a transmit buffer containing a plurality of characters of the message being transmitted to the enhanced lower level communications driver for transmission, and the enhanced lower level communications driver, while the other protocol stack is receiving a message, providing a receive buffer containing a plurality of characters of the message being received to the upper level communications driver.

15. A method as defined in claim 14 in which the base operating system is the MS-DOS operating system.

16. A method as defined in claim 14 in which the enhanced operating system is the Windows operating system.

17. A method as defined in claim 14 in which the base operating system is operating prior to initiation of said enhanced operating system session, the upper level communications driver assisting the enhanced operating system to load the enhanced lower level communications driver at a beginning of said enhanced operating system session.

18. A method as defined in claim 14 in which the enhanced operating system generates an enhanced operating system session start notification at a beginning of an enhanced operating system session, the upper level communications driver being enabled to respond to receipt of said enhanced operating system start notification by providing a pointer to a file containing a program for the enhanced lower level communications driver, the enhanced operating system being enabled to use the pointer to load the enhanced lower level communications driver and enable the enhanced lower level communications driver to initialize.

19. A method as defined in claim 18 in which the enhanced lower level communications driver, during initialization, is enabled to obtain selected communications parameter information from the upper level communications driver.

20. A method as defined in claim 18, the digital computer system including a message character signal transmitter for transmitting signals representative of the message characters over the communications network, the message character signal transmitter generating an interrupt indication when the message character signal transmitter has finished transmitting signals representative of said message character thereby to enable the message character signal transmitter to be provided with an subsequent character, prior to an enhanced operating system session the base lower level communications driver receiving the interrupt indication, during initialization of the enhanced lower level communications driver being enabled to condition the digital computer system to provide the interrupt indication to the enhanced lower level communications driver.

21. A method as defined in claim 18, the digital computer system including a message character signal receiver for receiving signals representative of the message characters over the communications network, the message character signal receiver generating an interrupt indication when the message character signal receiver has finished receiving signals representative of said message character thereby to enable the enhanced lower level communications driver to receive the character, prior to an enhanced operating system session the base lower level communications driver receiving the interrupt indication, during initialization of the enhanced lower level communications driver being enabled to condition the digital computer system to provide the interrupt indication to the enhanced lower level communications driver.

22. A method as defined in claim 18 in which the enhanced operating system also generates an indication after the enhanced operating system has loaded the enhanced lower level communications driver, the upper level communications driver following receipt thereof being enabled to transfer the message characters with the enhanced lower level communications driver.

23. A method as defined in claim 14 in which the enhanced operating system generates an enhanced operating system session end notification at an end of an enhanced operating system session, the upper level communications driver following receipt thereof being enabled to transfer the message characters with the base lower level communications driver.

24. A method as defined in claim 14 in which the enhanced operating system generates an enhanced operating system session end notification at an end of an enhanced operating system session, the enhanced lower level communications driver following receipt thereof being enabled to transfer the message characters with the base lower level communications driver.

25. A method as defined in claim 24, the digital computer system including a message character signal transmitter for transmitting signals representative of a message characters over the communications network, the message character signal transmitter generating an interrupt indication when the message character signal transmitter has finished transmitting signals representative of said message character thereby to enable the message character signal transmitter to be provided with an subsequent character, prior to receipt of an enhanced operating system session end notification the enhanced lower level communications driver receiving the interrupt indication, and in response to the enhanced operating system session end notification the enhanced lower level communications driver being enabled to condition the digital computer system to provide the interrupt indication to the base lower level communications driver.

26. A method as defined in claim 25, the digital computer system including a message character signal receiver for receiving signals representative of the message characters over the communications network, the message character signal receiver generating an interrupt indication when the message character signal receiver has finished receiving signals representative of said message character thereby to enable the enhanced lower level communications driver to receive the character, prior to receipt of an enhanced operating system session end notification the enhanced lower level communications driver receiving the interrupt indication, and in response to the enhanced operating system session end notification the enhanced lower level communications driver being enabled to condition the digital computer system to provide the interrupt indication to the base lower level communications driver.

27. A communication subsystem computer program product for use in connection with a digital computer system, the digital computer system processing application programs under a base operating system in a first processor operational mode, the digital computer system further processing application programs under an enhanced operating system during an enhanced operating system session under a second processor operational mode, the enhanced operating system during said enhanced operating system session making use of at least some selected elements of the base operating system, the communication subsystem enabling the digital computer system to transfer the messages, each comprising a series of characters, over a communications network, the communication subsystem computer program product comprising:

a digital computer system usable medium having digital computer system readable code embodied therein, the digital computer system readable code comprising upper level communication driver program code devices and base lower level communications driver program code devices both used in connection with the base operating system and enhanced lower level communications driver program code devices used in connection with the enhanced operating system, the upper level communications driver code devices and the base lower level communications driver code devices enabling the digital computer system to establish part of a protocol stack which enables the digital computer system to transmit and receive respective ones of said messages over the communications network while the digital computer system is operating under control of the base operating system, the upper level communications driver code devices, while the digital computer system is transmitting one of said messages, enabling said digital computer system to iteratively provide characters of the message being transmitted for processing by the digital computer system under control of the base lower level communications driver code devices, and the base lower level communications driver code devices, while the digital computer system is receiving one of said messages, enabling said digital computer system to iteratively provide characters of the message being received for processing by the digital computer system under control of the upper level communications driver code devices, the upper level communications driver code devices and the enhanced lower level communications driver code devices enabling the digital computer system to establish part of another protocol stack which enables the digital computer system to transmit and receive respective ones of said messages over the communications network during a session under which the digital computer system is operating control of the enhanced operating system, the upper level communications driver code devices, while the digital computer system is transmitting one of said messages, enabling the digital computer system to provide a transmit buffer containing a plurality of characters of the message being transmitted for processing by the digital computer system under control of enhanced lower level communications driver code devices, and the enhanced lower level communications driver code devices, while the digital computer system is receiving a message, enabling the digital computer system to provide a receive buffer containing a plurality of characters of the message being received for processing under control of the upper level communications driver code devices.

28. A communication subsystem computer program product as defined in claim 27 in which the base operating system is the MS-DOS operating system.

29. A communication subsystem computer program product as defined in claim 27 in which the enhanced operating system is the Windows operating system.

30. A communication subsystem computer program product as defined in claim 27 in which the base operating system is operating prior to initiation of said enhanced operating system session, the upper level communications driver program code devices enabling the digital computer system to assist the enhanced operating system to load the enhanced lower level communications driver program code devices at a beginning of said enhanced operating system session.

31. A communication subsystem computer program product as defined in claim 27 in which the enhanced operating system generates an enhanced operating system session start notification at a beginning of an enhanced operating system session, the upper level communications driver program code devices enabling the digital computer system to respond to receipt of said enhanced operating system start notification by providing a pointer to a file containing a program for the enhanced lower level communications driver program code devices, the enhanced operating system using the pointer to enable the digital computer system to load and initialize the enhanced lower level communications driver program code devices.

32. A communication subsystem computer program product as defined in claim 31 in which the enhanced lower level communications driver program code devices, during initialization, enables the digital computer system to obtain selected communications parameter information maintained by the digital computer system under control of the upper level communications driver program code devices.

33. A communication subsystem computer program product as defined in claim 31 in which the digital computer system includes a message character signal transmitter for transmitting signals representative of the message characters over the communications network, the message character signal transmitter generating an interrupt indication when the message character signal transmitter has finished transmitting signals representative of said message character thereby to enable the message character signal transmitter to be provided with an subsequent character, prior to an enhanced operating system session the digital computer system, under control of the base lower level communications driver program code devices, receiving the interrupt indication, during initialization of the enhanced lower level communications driver program code devices the digital computer system being conditioned to receive the interrupt indication under control of the enhanced lower level communications driver program code devices.

34. A communication subsystem computer program product as defined in claim 31 in which the digital computer system includes a message character signal receiver for receiving signals representative of the message characters over the communications network, the message character signal receiver generating an interrupt indication when the message character signal receiver has finished receiving signals representative of said message character thereby to enable the enhanced lower level communications driver to receive the character, prior to an enhanced operating system session the digital computer system, under control of the base lower level communications driver program code devices, receiving the interrupt indication, during initialization of the enhanced lower level communications driver program code devices the digital computer system being conditioned to receive the interrupt indication under control of the enhanced lower level communications driver.

35. A communication subsystem computer program product as defined in claim 31 in which the enhanced operating system also generates an indication after the enhanced operating system has loaded the enhanced lower level communications driver program code devices, the upper level communications driver program code devices enabling the digital computer system, following receipt thereof, to transfer the message characters with the digital computer system under control of the enhanced lower level communications driver program code devices.

36. A communication subsystem computer program product as defined in claim 27 in which the enhanced operating system generates an enhanced operating system session end notification at an end of an enhanced operating system session, the upper level communications driver program code devices enabling the digital computer system, following receipt thereof, to transfer the message characters with the digital computer system under control of the base lower level communications driver program code devices.

37. A communication subsystem computer program product as defined in claim 27 in which the enhanced operating system generates an enhanced operating system session end notification at an end of an enhanced operating system session, the enhanced lower level communications driver program code devices enabling the digital computer system, following receipt thereof, to transfer the message characters with the digital computer system under control of the base lower level communications driver program code devices.

38. A communication subsystem computer program product as defined in claim 37 in which the digital computer system includes a message character signal transmitter for transmitting signals representative of the message characters over the communications network, the message character signal transmitter generating an interrupt indication when the message character signal transmitter has finished transmitting signals representative of said message character, prior to receipt of an enhanced operating system session end notification the digital computer system, on receipt of the interrupt notification, using the enhanced lower level communications driver program code devices to provide the message character signal transmitter with a subsequent character, and after receipt of the enhanced operating system session end notification the digital computer system using the base lower level communications driver program code devices to provide the message character signal transmitter with a subsequent character.

39. A communication subsystem computer program product as defined in claim 37 in which the digital computer system includes a message character signal receiver for receiving signals representative of the message characters over the communications network, the message character signal receiver generating an interrupt indication when the message character signal receiver has finished receiving signals representative of said message character, prior to receipt of an enhanced operating system session end notification the digital computer system, on receipt of the interrupt notification, using the enhanced lower level communications driver program code devices to receive the character, and after receipt of the enhanced operating system session end notification the digital computer system using the base lower level communications driver program code devices to receive the character.

* * * * *